United States Patent [19]

Slater et al.

[11] 4,389,535
[45] Jun. 21, 1983

[54] CABLE ENTRY PORT MEANS FOR ELECTRICAL OUTLET BOX

[75] Inventors: Thomas S. Slater, Port Washington; Wade R. Bowden, Jr., Northport, both of N.Y.

[73] Assignee: Slater Electric Inc., Glen Cove, N.Y.

[21] Appl. No.: 257,814

[22] Filed: Apr. 27, 1981

Related U.S. Application Data

[60] Division of Ser. No. 22,993, Mar. 22, 1979, abandoned, which is a continuation-in-part of Ser. No. 879,767, Feb. 21, 1978.

[51] Int. Cl.³ .............................................. H02G 3/08
[52] U.S. Cl. .................................. 174/65 R; 220/3.2; 339/103 R
[58] Field of Search .................... 174/53, 65 R, 65 G, 174/153 G; 220/3.2–3.94, 265, 266, 268; 248/56; 339/103 R, 103 B, 103 C, 107

[56] References Cited

U.S. PATENT DOCUMENTS

| | | | |
|---|---|---|---|
| 1,039,955 | 10/1912 | Keefe | 220/266 X |
| 1,242,533 | 10/1917 | Duck | 220/3.3 X |
| 1,971,831 | 8/1934 | Fullman | |
| 1,980,831 | 11/1934 | Rosenfield | |
| 2,466,504 | 4/1949 | Stoyer | |
| 2,688,417 | 9/1954 | Bowers | |
| 2,814,510 | 11/1957 | Clark | |
| 2,850,300 | 9/1958 | Jennings | |
| 3,084,958 | 4/1963 | Appleton | 174/65 R X |
| 3,112,938 | 12/1963 | Karlin | |
| 3,288,407 | 11/1966 | Downer et al. | 174/153 G X |
| 3,351,974 | 11/1967 | Wilhelmi | 174/153 G X |
| 3,493,205 | 2/1970 | Bromberg | |
| 3,788,582 | 1/1974 | Swanquist | |
| 3,873,759 | 3/1975 | Schindler et al. | 174/65 R X |
| 4,007,852 | 2/1977 | Gernhardt | 220/266 X |
| 4,030,800 | 6/1977 | Vidoni et al. | 339/107 |
| 4,076,364 | 2/1978 | Kuo | 339/103 R |
| 4,082,915 | 4/1978 | Silver | 174/65 R X |
| 4,202,457 | 5/1980 | Tansi | 220/3.3 |

FOREIGN PATENT DOCUMENTS

| | | | |
|---|---|---|---|
| 2349766 | 10/1972 | Fed. Rep. of Germany | |
| 349319 | 10/1960 | Switzerland | 174/65 R |
| 459323 | 9/1965 | Switzerland | |
| 988663 | 4/1965 | United Kingdom | 174/153 G |
| 1396790 | 6/1975 | United Kingdom | 339/101 |

OTHER PUBLICATIONS

Brochure Showing No. 425, "Bush–Grip Connectors", made by Blackhawk Industries, Dubuque, Iowa.

*Primary Examiner*—A. T. Grimley
*Assistant Examiner*—D. A. Tone
*Attorney, Agent, or Firm*—Morgan, Finnegan, Pine, Foley & Lee

[57] ABSTRACT

An electrical outlet box has electrical power cable entry ports in which one or more closure panels are each mounted adjacent the rim of the aperture along one edge portion only of the panel, the remaining portion of each panel being free and extending substantially across the aperture in a direction angularly inwardly from the plane of the aperture. The closure panels are each either hingedly mounted or sufficiently flexible and resilient so as to be self-opening, such that each free end portion is deflected away from the opening upon passage of the cable into the aperture by manual force, and thereafter resistingly bears against the installed cable. Each panel may be tapered so as to have increased thickness at the base, in which case the panels are self-clamping against removal of the cable from the aperture, and may include supplementary cable gripping projections on their outwardly facing surfaces. The closure panel or panels may also be self-locating and self-adjusting for different cable sizes up to a maximum size equal to the size of the aperture. Access to the box through the cable entry port may be substantially prevented by a frangible closure member, either as a thin web joining the free end of a single closure panel to the wall structure of the box or joining the free ends of two or more panels together, or as a separate conventional knockout panel frangibly interconnected to the rim of the cable entry aperture. The closure panel or panels and outlet box also may be formed as an integral structure.

6 Claims, 25 Drawing Figures

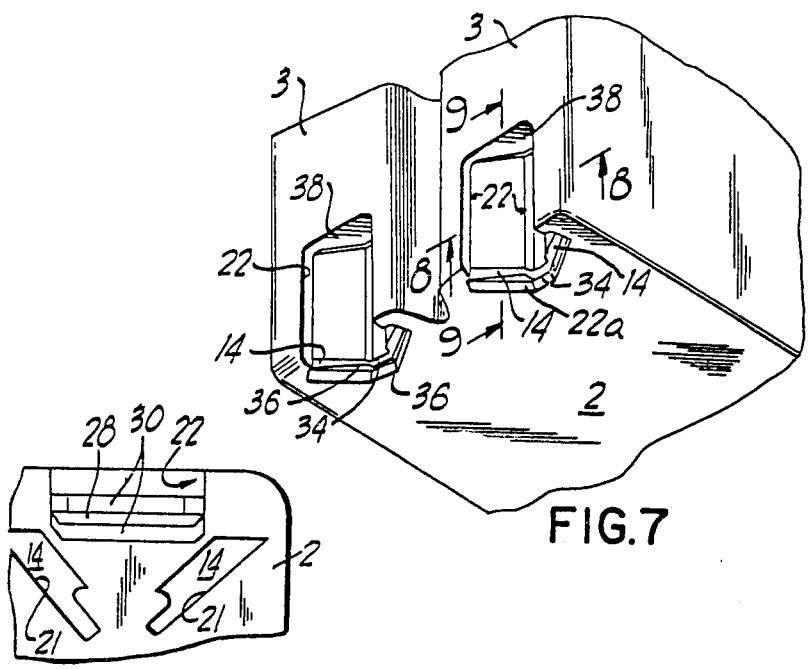
FIG. 7
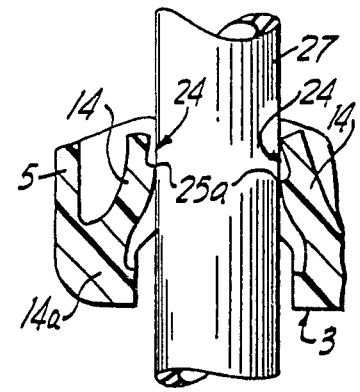
FIG. 6
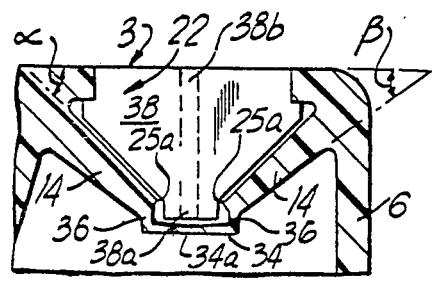
FIG. 5
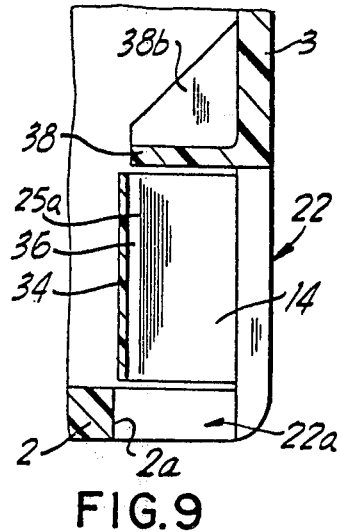
FIG. 8
FIG. 9
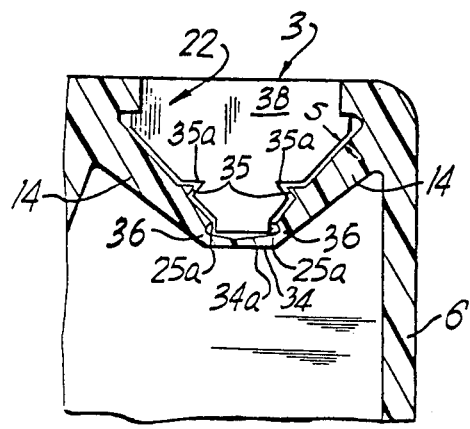
FIG. 10

CABLE ENTRY PORT MEANS FOR ELECTRICAL OUTLET BOX

RELATED APPLICATIONS

This is a division, of application Ser. No. 22,993 filed Mar. 22, 1979, now abandoned which is a c-i-p of Ser. No. 879,767, filed Feb. 21, 1978, also assigned to the assignee of this application, the disclosure of which is hereby expressly incorporated herein by reference as if fully set forth herein.

BACKGROUND AND OBJECTS OF THE INVENTION

1. Field of the Invention

The present invention relates generally to electrical outlet boxes and the like and relates more particularly to certain new and useful improvements in the configuration and structure of the cable entry ports in such boxes which facilitate the admission of electrical power cable into the outlet box and retention of the installed cable in the box.

The usual electrical outlet box is constructed in a generally open top, box-like configuration with a generally continuous side wall member depending from a back or bottom wall, and formed with one or more cable entry ports (hereinafter sometimes referred to as "knockout windows") in the side wall member, which are adapted to permit access of electrical power cables into the interior of the box. One or more electrical power cables are inserted into the box, each through a cable port opening, for connection of the conductor wires to, or termination with, the electrical fixture to be mounted in the box. Moreover, in order to prevent debris from entering the box through cable ports that are not utilized, and to minimize fire spead in the event that the electrical appliance housed in the box malfunctions, the typical cable entry ports in electrical outlet boxes are substantially completely closed by "knockout" panels which are removably attached to the box wall structure across each port opening.

It will be understood that although the present invention is described with particular reference to electrical outlet boxes which are adapted to house the termination, i.e., electrical connection, between the conductor wires of an electrical power cable and an electrical fixture such as an electrical outlet receptacle or an electrical switch, the present invention may be adapted, where desired, for use in other housings for electrical distribution appliances, such as electrical junction boxes, flush type boxes, etc. Accordingly, when used herein, the term "electrical outlet box" is intended to embrace such additional structures.

Also, although the present invention is described with particular reference to an electrical outlet box formed from a moldable plastic material and to insulated electrical power cable having an oval jacket of a molded plastic composition which is soft and readily deformable, known in the art as "ROMEX" cable, the present invention may be adapted for use in an electrical outlet box formed from a metallic material, in which case it will be understood that either the aforesaid "ROMEX" cable or the helical metal jacketed cable, known in the art as "BX" cable, may be used. Accordingly, the term "electrical power cable" is intended to embrace both plastic and metal jacketed cables.

It will also be understood that although the present invention is described with respect to rectangularly-shaped electrical outlet boxes, the invention is equally applicable to other conventionally shaped boxes, including round boxes.

2. Description of the Prior Art

It is conventional for electrical outlet boxes to have a number of cable entry ports in which a panel or closure member normally substantially closes the port aperture and is removed, or "knocked-out", to permit passage of electrical power cable into the box.

As previously known, however, electrical outlet box "knockouts" have been disadvantageous from several standpoints. Thus, removal or deflection of the "knockout" from the port has heretofore required the use of a separate tool, such as a screwdriver or hammer or the like, resulting in a time-consuming two-step operation in order to insert the cable into the box. Also heretofore, the port aperture and the closure panel have been of a single fixed size, usually to accommodate the largest size standard electrical power cable possible under the applicable electrical code regulations, such that, upon removal of the closure panel, there is a substantial gap between smaller-sized standard power cables and the rim of the aperture, which subjects the installation to the aforementioned hazards of debris collection and fire spread.

In some applications, it also has been found that the connection between the conductor wires of the cable and the electrical appliance may be stressed or dangerously loosened by forces exerted on the cable or wires at other locations after installation. In addition, during construction of the wall structure in which the outlet box is installed, the cable conventionally is inserted through the cable entry port after the box is mounted in place, but the electrical appliance may not be connected to the cable and installed in the outlet box until after the wall structure is secured in place. The cable is thereby susceptible to accidental removal from the cable entry port before it is connected to the appliance, and a significant, further time-consuming effort may be required to reinsert the cable into the box.

In order to fixedly retain the cable in the box for preventing such stressing on the connections or for preventing removal from the knockout window, clamping devices have been previously developed or proposed, which are adapted to be secured in or adjacent each knockout window opening and to grasp the cable firmly for preventing withdrawal from the box. In fact, such clamping devices are presently required by the National Electric Code for multigang boxes and for so-called "old work" boxes.

Heretofore, however, most cable clamping devices have been formed as independent structures which have to be fabricated separately from the box itself, in relatively complicated structures, such as shown in U.S. Pat. Nos. 3,788,582 issued to Swanquist, and 3,493,205 issued to Bromberg. These structures involve substantial fabrication costs over and above those of making the box alone. In addition, since clamping devices have to be affixed to the box, they also entail additional installation time and consequent labor expense. Moreover, in order to be fixedly secured in the knockout window of the box, the engaging means for the separate clamping device must be proportioned to fit the particular configuration of the knockout window. Thus, unless all knockout window apertures are standardized in size and shape, numerous different sized and/or shaped devices are needed, thereby greatly increasing the costs of manufacture, inventory and installation time.

Although a metal electrical outlet box has been proposed in which a cable clamp is formed integrally with the box structure, such as U.S. Pat. No. 3,112,938 issued to I. P. Karlin in 1963, the clamping structure there proposed does not automatically grasp nor resistingly bear against the installed cable and several manipulative steps with separate tools are necessary in order to assemble the cable port closure structure into a clamping position. Thus, the Karlin structure is not self-opening nor self-clamping nor self-adjusting. Moreover, the Karlin U.S. Pat. No. 3,112,938 structure is disadvantageous since it is possible to erect Karlin's port structure with too large of a space between the cable engaging edge of the port structure and the cable, so that clamping either is not effected at all or necessitates more manipulation to establish the proper spacing in order to obtain a clamping action.

A thermoplastic electrical junction box with an integral locking and sealing structure also has been proposed in Swiss Pat. No. 349,319 issued to F. Meili in 1960. In that patent, the entry ports of the box are normally closed by knockout or cut-out covers which, when removed in the conventional manner, leave a circular rim of slightly smaller diameter than that of the port aperture, which is inclined inwardly of the aperture to form a relatively rigid and relatively sharp circular inner edge. Thermoplastic insulating pipe for carrying electrical conductor wires is formed with transverse cuts in the surface thereof and then inserted into the box aperture, whereupon the aforesaid relatively sharp inner edge of the aperture rim enters the cut in the manner of a barb to both seal and lock the pipe within the aperture against reverse outward movement. As in the Karlin U.S. Pat. No. 3,113,938, the 1960 Swiss Pat. No. 349,319 is therefore not self-opening and is not self-clamping as the structure does not automatically grasp nor deflect laterally so as to resistingly bear against the installed pipe. The Swiss patent's entry port structure is also not self-adjusting to different sizes of pipe and is otherwise disadvantageous since the requirement for cuts in the surface of the installed pipe would be difficult to obtain in conventional metal jacketed cable and unacceptable in conventional insulated plastic jacketed cable.

Finally, Swiss Pat. No. 459,323 issued to A. Grossauer in 1968 discloses an injection-molded plastic electrical junction box having entry ports for electrical conduit piping which include relatively thin tongues molded integrally with the box, which are spaced radially about the rim of the entry aperture and extend in the plane of the aperture. The entire box is covered with a sheath of rubber or plastic, including the entry ports. Although this patent indicates that the tongues clamp tightly against the conduit piping when the latter is attempted to be withdrawn, the tongues are said to be relatively thin and are formed in the plane of the aperture and therefore very little clamping strength is available due to the large amount of deflection required to pass a conduit through the aperture. Also, due to their location and orientation in the plane of the aperture, it is believed that the tongues would be easily broken upon application of a reverse outward force on the conduit and, at best, only a small range of different-sized cables could be accommodated by any one length of tongue. Also, the provision of a rubber or plastic sheath enveloping the entire box in order to close the conduit entry ports is believed to be impractical and tends to disguise their location, making installation of the conduit more difficult.

Objects of the Invention

It is therefore an object of this invention to provide a new and improved electrical outlet box.

Another object of this invention is to provide a new and improved electrical outlet box having a novel and improved cable entry port structure.

Another object of this invention is to provide a new and improved electrical outlet box which facilitates entry and retention of electrical power cable in the cable entry ports.

Another object of the present invention is to provide new and improved cable clamp means for electrical outlet boxes and the like.

Another object of this invention is to provide a novel and improved cable entry port structure for an electrical outlet box which is self-opening by manual force of the end of the electrical power cable against the port structure.

Another object of this invention is to provide a novel and improved cable entry port structure for an electrical outlet box which is self-clamping against removal of the electrical power cable from the entry port.

Another object of this invention is to provide a novel and improved cable entry port structure for an electrical outlet box which is self-adjusting to different sizes of electrical power cables passing into the box chamber.

Another object of this invention is to provide a novel and improved cable entry port structure for an electrical outlet box which is self-locating, such that the electrical power cable is installed in the entry port aperture at the same predetermined position, regardless of size.

Another object of this invention is to provide a novel and improved cable entry port structure for an electrical outlet box which can be relatively easily and inexpensively formed as an integral part of an electrical outlet box, and yet which is unexpectedly durable and strong in use.

Another object of this invention is to provide a novel and improved cable entry port structure for an electrical outlet box which includes frangible closure means substantially preventing access into the box through the cable entry port structure and adapted to rupture when subjected to a predetermined force to permit entry of the electrical power cable into the box chamber.

Another object of this invention is to provide a new and improved electrical outlet box having a novel and improved cable entry port structure which eliminates or overcomes the disadvantages of previously known cable entry ports for electrical outlet boxes or the like.

Another object of the invention is to provide a novel and improved cable entry port structure for an electrical outlet box which enables the cable to be quickly and easily installed and automatically clamped to the wall structure of the box in the installed position without the use of tools or parts separate from the cable and box.

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

SUMMARY OF THE INVENTION

Briefly described, the present invention is directed to a new and improved cable entry port structure for an electrical outlet box which facilitates both entry of the electrical power cable into the box and subsequent retention of the installed cable within the box chamber.

As preferably embodied, the cable entry port structure of the invention is formed as an integral part of the wall structure of the electrical outlet box and comprises one or more closure panels, each of which are mounted adjacent the rim of the port aperture along one edge portion only of the panel, the remaining portion of each panel being free and extending substantially across the aperture in a direction angularly inwardly from the plane of the aperture. The closure panels are each either hingedly mounted to the rim of the port aperture or are sufficiently flexible and resilient such that the free end portion of each panel is deflected away from the opening upon manually pushing the end of the cable into the aperture, and thereafter resistingly bears against the installed cable.

In another preferred embodiment of the invention, each of the closure panels are tapered so as to have increased thickness at the base, in which case the panels are self-clamping against removal of the installed cable from the aperture, and preferably also include supplementary cable gripping projections on their outwardly facing surfaces.

Also as preferably embodied, access to the box through the cable entry ports is substantially prevented by a frangible closure member, which may be either a thin web joining the free end of a single closure panel to the wall structure of the box or joining the free ends of two or more panels together, or as a separate conventional knockout panel frangibly interconnected to the rim of the cable entry aperture.

It will be apparent from the foregoing general description that the objects of the invention specifically enumerated herein are accomplished by the invention as here embodied.

Thus, it has been found that one or more closure panel members may be formed integrally with the wall structure of an electrical outlet box adjacent the rim of the aperture forming the cable entry port and extending angularly inwardly therefrom. It has also been found that one or more of the aforesaid closure panel members may be surprisingly easily and relatively inexpensively integrally molded into a moldable electrical outlet box.

By providing the angularly inwardly extending closure panel members with free inner end portions and also with both flexibility and resiliency, either by means of the material of construction and/or the proportions thereof or by mounting the panel members to the wall structure of the box by means of a living hinge, the closure panels will deflect away from the aperture to permit the electrical power cable to enter into the box chamber and will thereafter resistingly bear against the cable so as to maintain an opening which is always essentially equal in size to the cross-section of the installed cable. It has also been unexpectedly found that this port closure structure may be deflected with no more force than is developed by simply manually pushing the end of the cable against the closure panels, including, in particular, the aforesaid soft plastic jacketed "ROMEX" cable. As a result, the port closure structure of the invention is self-opening since no separate tool is required to open the port closure panels. In addition, the inwardly angled closure panels automatically self-adjust the size of the port opening to that of the installed cable, thereby at all times minimizing debris collection in the box and the aforementioned potential hazard of fire spread, without being broken away. A further advantage found from this port closure structure where the closure panel or panels angle inwardly from the plane of the aperture is that it serves to automatically positively locate the electrical cable at a predetermined position for entrance into the box chamber.

It has also been found, in the embodiment of the invention where the closure panel members are tapered so as to be thicker at the base thereof adjacent the rim of the cable entry port structure, that the camming action of the panel members against the cable upon the application of a reverse outward force to the cable is unexpectedly and surprisingly strong, such that the cable is securely and positively clamped against reverse outward movement without the need for any separate or external parts. In particular, it has been found that although the closure panel members are molded from plastic the aforesaid structure resistingly bears against the soft plastic jacketed electrical power cable with such force that it indents the outer surface of the jacket, and provides a surprisingly strong and effective clamping action against such cable.

Moreover, by forming supplementary, sharp-edged rib-like projections on the outwardly facing surfaces of the closure panel members, provision is made for grasping a full range of sizes of cable up to the maximun size cable that will be accepted by the aperture. Thus, there is no need for fabricating separate cable clamp devices for different sized cables, or providing separate boxes for use with different sized cables or conduit.

It has also been found that by recessing the base of the closure panel members from the rim of the cable entry port aperture, in addition to permitting the panel members to deflect and clamp against cables equal in size to the size of the aperture without breaking, the closure panel members may be formed integrally with the wall structure of the box along with the usual cable entry port "knockout" panels frangibly removably attached across the cable port aperture.

It will be understood that the foregoing general description and the following detailed description as well are exemplary and explanatory of the invention but are not restrictive thereof.

The accompanying drawings, referred to herein and constituting a part hereof, illustrate preferred embodiments of the invention, and together with the description, serve to explain the principles of the invention.

BRIEF DESCRIPTION OF THE DRAWINGS

FIG. 5 is a partial bottom plan view of the back or bottom of the box shown in FIGS. 1 and 2, taken as indicated at 5—5 of FIG. 4;

FIG. 6 is a section view similar to that shown in FIG. 3, illustrating the opposed tapered and angled closure panels in deflected position, and resistingly bearing against the installed cable;

FIG. 7 is a fragmentary perspective view of an electrical outlet box constructed in accordance with another embodiment of the present invention, wherein the cable entry port structure includes only the opposed tapered and angled closure panel members as shown in FIG. 1, the convergent inner free ends being joined by a frangible web;

FIG. 8 is a view along section 8—8 of FIG. 7;

FIG. 9 is a view along section 9—9 of FIG. 7;

FIG. 10 is a section view similar to that shown in FIG. 8, showing the closure panel members with supplementary gripping projections;

DESCRIPTION OF THE PREFERRED EMBODIMENTS

Figure 1:
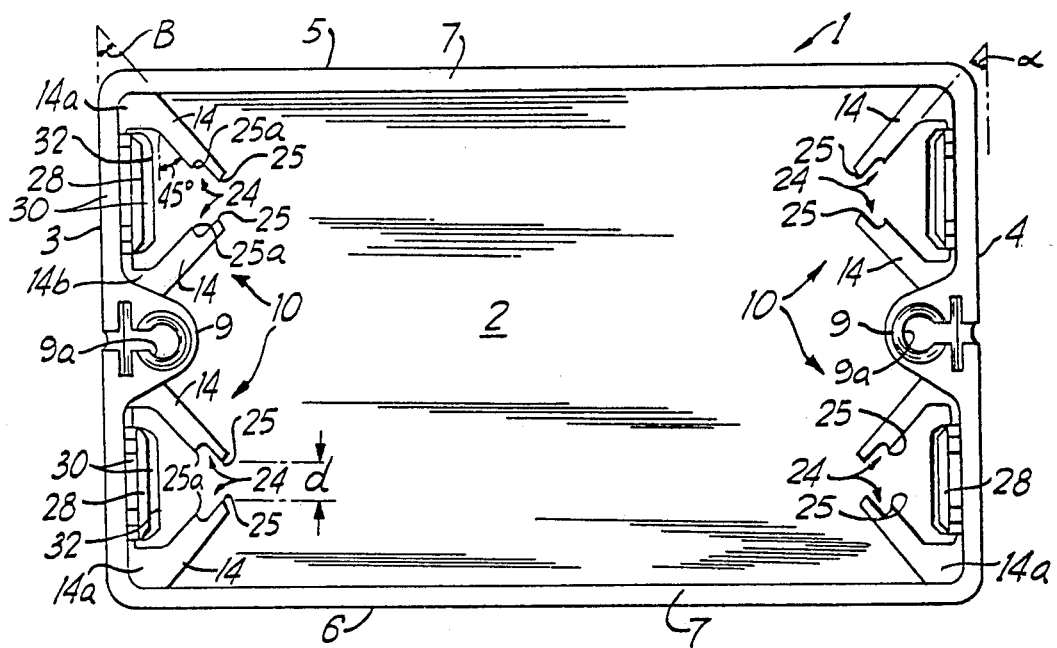
FIG. 1 is a top plan view of an electrical outlet box embodying the present invention, the view illustrating a first panel member frangibly interconnected across each cable entry port aperture and an additional pair of tapered closure panel members converging angularly inwardly toward one another from the opposite sides of the aperture for clamping an electrical power cable inserted into the entry port against reverse outward movement.

Referring generally to the embodiments of the invention shown in the accompanying drawings, wherein like reference numerals refer to like parts, there is illustrated an electrical outlet box, indicated generally by reference numeral 1, which advantageously may be of a generally rectangular shape and includes a bottom wall 2, a pair of opposed end walls 3, 4, a pair of opposed side walls 5, 6 extending between the aforesaid end walls, each of the end and side walls terminating in a continuous front edge 7 lying in a frontal plane which is parallel to the bottom wall 2 and defines the front opening 8 of the box. Outlet box 1 also advantageously includes an opposed pair of conventional mounting post members 9 adjacent each of the end walls 3, 4 for securing an electrical fixture to the box, as is well known in the art. Advantageously, each of posts 9 includes an unthreaded borehole 9a (see FIG. 1) for slidably receiving a mounting clip (not shown) in each of the posts adjacent the borehole for quick fastening of a threaded screw thereto, such as is more fully described in U.S. Pat. Nos. 3,955,463 and 4,105,862, the disclosures of which are incorporated herein by reference.

As previously mentioned, it will be understood that, although a rectangular outlet box is illustrated in the drawings and referred to in describing the invention, the invention is not limited to any particular box configuration, and its application to boxes of other configurations, such as round boxes, will be readily apparent to those of ordinary skill in the art. Also, it will be understood that box 1 may be suitably adapted for attachment to a stud, to wallboard and the like in any desired fashion. However, for convenience in describing the present invention, such mounting means are not shown on box 1.

Referring now more particularly to FIGS. 1-6 of the accompanying drawings, there is illustrated a first embodiment of cable entry port means constructed in accordance with the invention, indicated generally by reference number 10, which is adapted to be formed integrally with the wall structure of electrical outlet box 1, and which is self-clamping against removal of a cable installed in the entry port.

In accordance with the invention, cable entry port means 10 includes a pair of closure panel members, both indicated by reference number 14, which depend from opposite sides of the rim of cable entry apertures, preferably formed in end walls 3 and 4 of outlet box 1, and converge angularly inwardly toward each other, terminating in free ends 25 separated by a distance which is preferably less than the narrowest dimension of the electrical power cable to be inserted into the box. The cable entry apertures are indicated generally at 22 and provide access for admitting an electrical power cable to the interior of box 1.

As here preferably embodied, each closure panel 14 extends from a portion of its corresponding end wall 3 or 4, so that its outwardly facing surface forms an angle, indicated at $\alpha$ in FIG. 1, of about 45° with end walls 3, 4. In addition, the angle, $\beta$, formed by the inwardly facing surface of each panel member and the adjacent end wall 3 or 4 is, advantageously, slightly smaller, preferably on the order of about 35°–40°, than that made by its outwardly facing surface, so that the panel members 14 each taper slightly towards their convergent inner free ends 25, providing a generally rigid portion where the panel is attached to the end wall at the rim of the aperture, while also providing flexibility at the convergent inner free ends 25, such that the panel members 14 deflect laterally away from one another upon passage of the cable into the aperture 22.

Also as preferably embodied, and as is more fully described hereinafter, closure panel members 14 are formed from a material having suitable resiliency such that, upon being deflected laterally away from one another and also relative to aperture 22, the free end portions thereafter resistingly bear against the installed cable.

For additional flexibility, the thickness of the free end portion of each closure panel 14 advantageously may be reduced by about half, as by notch 24 preferably formed at about 1/16" to about ⅛" from the end edge 25 of each panel member to provide a generally flexible and resilient end to grasp a cable. Thus, the end edge of each panel 14 is much more flexible than the rest of the panel 14 so that relatively thin cables (such as indicated in phantom at 26 in FIG. 3) can be inserted between the inner grasping edges without causing the cable to bend. Moreover, the reduced thickness inner end edges enable secondary grasping points to be provided with substantial rigidity while the thin ends move out of the way of thicker cables, as will be described more fully below with reference to FIG. 6.

Accordingly, when electrical power cable 26 is inserted into an open cable entry aperture 22, the cooperating opposed tapered and angled panel members 14 will resiliently flex inwardly of the box to permit relatively easy insertion of the cable and thereafter resistingly bear against the installed cable. Thereafter, upon application of a reverse outwardly directed force on the cable, tending to remove the cable from opening 22, the convergent inner free ends 25 of panels 14 are urged by means of a camming action progressively more tightly against the cable, into increasing gripping engagement therewith, thereby effectively clamping the cable against reverse outward movement.

It has been found that, where the plastic jacketed "ROMEX" cable is used, the inner ends 25 of panels 14 resistingly bear against the cable with sufficient force to indent the cable jacket, which force remains even at high temperatures, on the order of 90° C., enabling the aforesaid camming action to be obtained under high temperature conditions for both plastic and metal jacketed cable. To the foregoing end, the free end edge 25 of each closure panel 14 advantageously is formed with a generally sharp corner, facing the other panel in each cooperating pair of panel members to provide a rib-like structure for wedging into cable 26. In addition, the distance between such cooperating sharp edges is advantageously proportioned to accommodate the variety of thicknesses for the cables which may be received within the cable entry apertures 22 in box 1. Thus, for example, for the usual residential single- and double-gang outlet boxes, adapted to accommodate AWG (American Wire Gauge) #14, #12 or #10 wires, the spacing between the inner end edges 25 of panel members 14, indicated at d in FIG. 1, is advantageously dimensioned at about 0.15 inches.

When a relatively large diameter cable, indicated at 27 in FIG. 6, is inserted into the cable opening 22, the cooperating pair of closure panels 14 spread apart in a generally elliptically-shaped curved configuration, as shown in FIG. 6, since they are essentially cantilever beams. As a result, the end edges 25 of closure panels 14 may be unable to grasp the cable. Therefore, in accordance with the invention, supplementary gripping means is provided for grasping and clamping the cable against reverse outward movement. To this end, secondary grasping means, in the form of a rib-like projection, indicated at 25a in FIG. 3 and formed by notch 24, are preferably formed on each panel 14, recessed from the end edge 25 to grasp the insulation on thick cable 27 for preventing withdrawal thereof. Moreover, projections 25a can be stiffened, or buttressed, by providing any desired thickness to the portion of each panel between the notch 24 and the wall portion to which the panel is attached, to ensure a firm grasp on such large cables. Alternatively, panel 14 may be formed with rib-like projections, such as shown at 35 and described below with reference to FIG. 10, either instead of or in addition to the notch/edge configuration 24, 25a.

Figure 2:
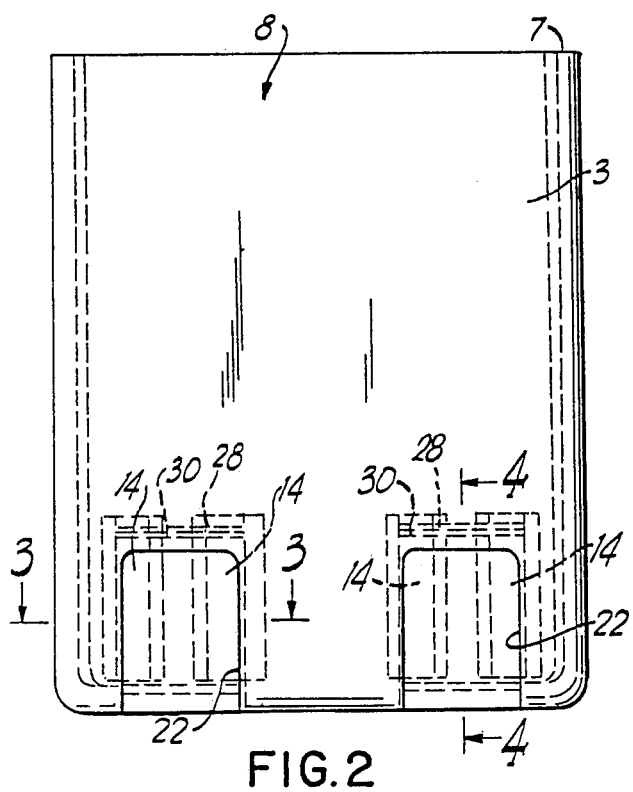
FIG. 2 is an elevation view of one end wall of the box shown in FIG. 1.
Figure 4:
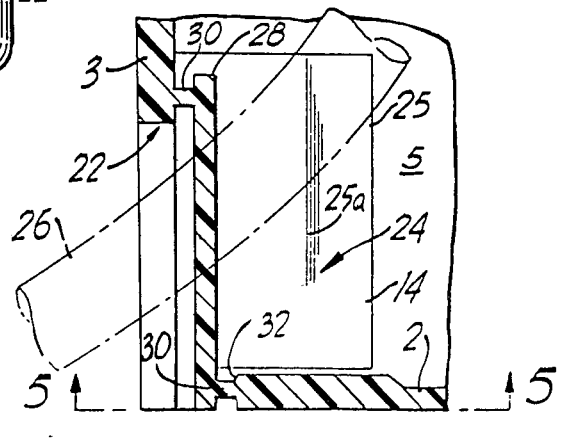
FIG. 4 is a view along section 4—4 of FIG. 2.
Figure 11:
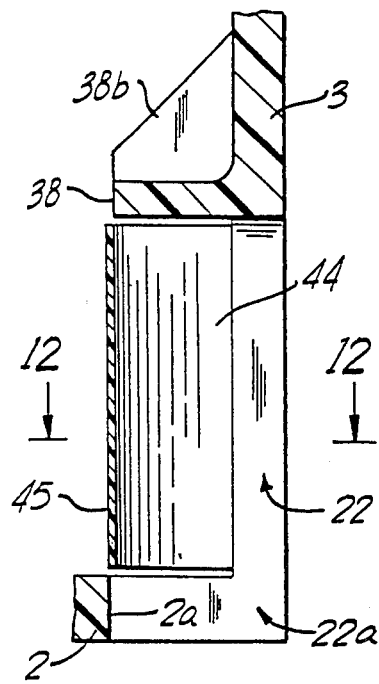
FIG. 11 is a fragmentary longitudinal sectional view, partly in elevation, similar to that of FIG. 9, of an electrical outlet box constructed in accordance with a still further embodiment of the invention, wherein the opposed converging closure panel members are of essentially uniform thickness and are joined at their inner convergent ends by a frangible web.

As preferably embodied, closure panel members 14 extend lengthwise, from a point just in front of bottom wall 2 of outlet box 1, as described more fully hereinafter with respect to FIG. 5, to a point forward of the front edge of aperture 22, as shown in FIGS. 2 and 4. Accordingly, if cable 26 is inserted into opening 22 from behind box 1 so that it curves towards the front of the box, as indicated in phantom in FIG. 4, the cable will still be retained in the box by the portion of the closure panel members 14, which lies forward of the front edge of opening 22.

Figure 3:
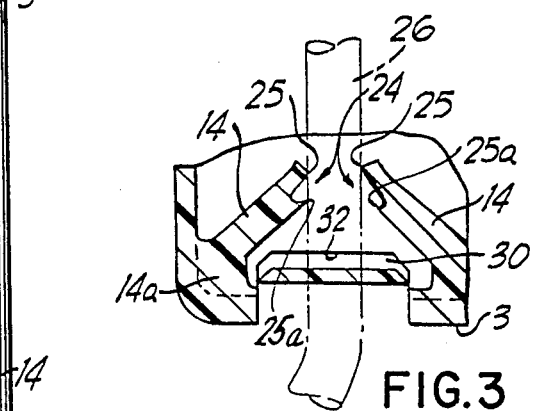
FIG. 3 is a view along section 3—3 of FIG. 2.

According to the invention, as illustrated in FIGS. 1–6, cable entry port structure 10 may advantageously be adapted to permit the usual "knockout" closure panel to be formed across each cable entry port 22 for preventing fire spread as well as preventing any debris from entering any cable entry port that is not utilized for allowing access into the box for an electrical power cable. To this end, each closure panel member 14 is preferably attached to its corresponding end wall portion 3,4 by a projection, or base portion, 14a, as best shown in FIGS. 1 and 3, which is slightly recessed from the rim of aperture 22 and spaces the panel 14 inwardly from its associated end wall. In this way closure panels 14 themselves are sufficiently spaced inwardly and laterally of the rim of aperture 22 to accommodate the usual knockout closure panel, indicated at 28, which is removably attached across each cable entry port 22. Advantageously, knockout panels 28 are attached to end wall portions 3, 4 by frangible web members 30, with shoulder 32 formed on bottom wall 2 to facilitate removal, similar to the knockout panel means disclosed in U.S. Pat. No. 4,007,852, assigned to the same assignee as the present application and which patent is hereby incorporated by reference herein. However, other conventional knockout window closure panels may be used, the structure of which will be apparent to those of ordinary skill in the art.

As preferably embodied, the side edges of knockout panel 28 are chamfered, or beveled, slightly, as shown in FIGS. 1 and 3, in order to permit the portions of the mold which form knockout panels 28 and closure panels 14 to be proportioned for sufficient structural strength to withstand the stresses generated during molding. Advantageously, shoulder 32 may be provided by forming bottom wall 2 with a generally thickened portion as shown in FIG. 4. In addition, it will be found that the base portions 14a associated with the panels 14 which are positioned adjacent the screw-mounting post 9 may, in part, extend directly from the post and those portions 14a associated with the panels 14 whch are positioned adjacent a side wall portion 5 or 6 may, in part, extend directly from that side wall portion.

Also as preferably embodied and as shown in FIG. 4, the bottom edges of closure panels 14 are formed separate from bottom wall 2 to enable them to be free and act independently of the bottom wall. To this end, the portion of the injection mold which forms the exterior surface of bottom wall 2 may be formed with projections proportioned and positioned to correspond to the cross-sectional area of each panel 14, forming holes 21 which extend completely through bottom wall 2 to define the bottom edge of each panel 14. The bottom edge of each panel is thereby visible from the bottom of box 1 through slots 21 as shown in FIG. 5. In this context, it will be understood that by forming bottom wall 2 with a thickened portion, as shown in FIG. 4, the bottom wall will be sufficiently strong to withstand all the stress, impact, etc. required by Underwriters' Laboratories and any Code writing association.

It will be understood that the present invention is not limited to any particular size of electrical outlet box or cable entry port structure and the following dimensions are given as an example of a box incorporating the invention, from which other equivalent dimensions will be apparent to those of ordinary skill in the art. Thus, it has been found in an electrical outlet box molded from an injection moldable thermoplastic resin material, more fully described hereinafter, that apertures 22 advantageously may be approximately one-half inch ($\frac{1}{2}''$) wide and one-half inch ($\frac{1}{2}''$) long; the point of convergence of closure panels 14 may be approximately three-eighths inch ($\frac{3}{8}''$) from the inside surface of end walls 3 or 4, and panels 14 may preferably taper from a thickness of about 0.030" (approximately 1/32") thick at their convergent inner free ends to about 0.060" (approximately 1/16") thick at their bases adjacent the rim of aperture 22.

The flexible inner edge portions of panels 14 may range from about 0.030"–0.050" thick when formed of the aforementioned thermoplastic material to provide the flexibility described above, with the thicknesses of the remaining panel portions determined by the angles $\alpha$ and $\beta$ if they are formed without secondary grasping means or projections 35. However, if the panel is formed with the notch and edge 24, 25a, the panel portion between the notch and the point of attachment may be made in a somewhat greater thickness, if desired.

Referring now more particularly to FIGS. 7-9 of the accompanying drawings, there is illustrated a preferred alternate embodiment of the electrical outlet box of the present invention, wherein the cable entry port means is self-opening, such that a conventional electrical power cable may be installed without the use of separate tools such as a screwdriver or the like.

To that end, as best seen in FIG. 8, the adjacent convergent inner ends 25 of closure panel members 14 are joined by a frangible web member 34, which is adapted to be readily broken by manually forcing the end of a conventional plastic or metal jacketed electrical power cable against the web. Although web 34 is shown extending along the entire length of the convergent inner ends of panels 14, alternatively, and with equally satisfactory results, web 34 may extend between the convergent ends 25 of panels 14 along only a short portion of their length, on the order of approximately $\frac{1}{8}$-$\frac{1}{4}$ inch, preferably at the mid-section thereof, in a manner similar to that shown in FIG. 14.

Web 34 advantageously is attached to the free end edges 25 of panels 14 by additional intermediate web sections 36 which are recessed back from the oppositely disposed pointed edges 25a which project towards each other in each cooperating opposed pair of panels 14. In this way, if web 34 is completely removed (as will be described more fully below), the remnants of web portions 36 left on closure panels 14 will be spaced from grasping edges 25a so as not to interfere with their cable gripping function.

As preferably embodied, each cable entry aperture 22 is formed with a component portion, designated at 22a, extending into bottom wall 2. The shape of aperture portion 22a is generally V-shaped and conforms to the cross-sectional configuration provided by the closure panel members 14, as indicated in FIG. 7. In this way, outlet box 1, panels 14 and frangible webs 34 and 36 can be integrally formed from a moldable plastic material and the bottom edges of panel members 14 can be formed separated from bottom wall 2 to provide freedom for each panel 14 to flex independently of bottom wall 2 when cable 26 is inserted therebetween.

Also, as preferably embodied, the generally V-shaped space between closure panels 14, which opens in a direction pependicular to the frontal plane 7 of the box, is at least substantially closed by a third closure panel 38 extending transversely and closely adjacent to the frontmost edges of the angled closure panels 14. Advantageously, a reinforcing rib or strut 38b is formed to extend between the top of port closure panel 38 and the inside surface of end walls 3, 4.

Of course, the front-facing edges of panel members 14 are formed independently of third closure panel 38 and as previously mentioned, the bottom-facing edges of panels 14 are formed independently of the bottom wall 2 of the outlet box 1, as shown in FIG. 9, to permit deflection of panel members 14. To this end, the innermost surface of web 34 preferably terminates even with the backwall upper lip, indicated at 2a, and the edges of rigid closure panel 38 are proportioned to correspond to the generally V-shaped contour of the opposed facing surfaces of panels 14 and web 34, or they may be slightly spaced therefrom, as indicated by the letter s in FIG. 10. In this way, the appropriate mold elements may be accommodated for forming the various surfaces and edges of panels 14 and 38, webs 34, 36 and bottom wall 2 in a two-part molding machine.

Third closure panel 38 serves not only to prevent fire spread and debris from falling into the interior of box 1 when web 34 is not opened but also to prevent a cable 26 from slipping forward, i.e. moving laterally towards the front of box 1, out of grasping engagement with the edges 25 of panel members 14. Thus, each cable entry port which is not utilized will remain substantially closed by the combination of closure panels 14, webs 34 and 36 and closure panel 38.

Referring now more particularly to FIG. 10, as previously mentioned, the supplementary cable gripping means of the invention may also include the formation of one or more additional relatively sharp-edged rib-like projections 35 extending along the length of the outwardly facing surface of each of panel members 14. Advantageously, projections 35 are located about 1/16" to about ⅛" from edge 25a, and enable the panels 14 to grasp thick cables despite substantial bending such as shown in FIG. 6. Furthermore, in order to form projections 35 by a two-part molding machine as described above, rigid closure panel 38 is preferably formed with corresponding notches, indicated at 35a, in registry with projections 35.

As previously mentioned, as preferably embodied frangible web 34 is readily pierceable by the force developed upon manually pushing the end of an electrical power cable against the web, so as to thereby be self-opening. To that end, web 34 may advantageously be formed with a reduced thickness center portion, indicated at 34a on FIGS. 8 and 10. It has been found that when formed from a thermoplastic resin material, as is more fully described hereinafter, web 34 will withstand a force of 10 pounds and yet be readily pierceable merely by pushing the end of an electrical power cable thereagainst, where the reduced thickness center portion is approximately 0.010" thick and the web increases in thickness to approximately 0.020" thick at its attachment to webs 36, the latter also approximately 0.020" thick.

Alternatively, it will be understood that if desired frangible web 34 may be formed somewhat thicker so as to be rupturable only with the aid of a separate tool such as a screwdriver or the like. According to one such embodiment, web portions 36 may be formed relatively thin so that web 34 resembles a narrow knockout panel which can be removed by pushing it inwardly with a screwdriver or similar tool, thereby breaking the webs 36. Alternatively, the tip of a prying tool may be inserted between the projecting end portion 38a of third panel 38 and the front-facing edge of web 34 to break webs 36 by prying web 34 inwardly, using the edge of projecting portion 38a, reinforced by rib 38b, as a fulcrum. Thereafter, a cable may be reinserted into the space between the oppositely disposed convergent ends 25 of panels 14 which will grasp the cable, as previously described.

It will be seen from the foregoing that the cable entry port means of the invention as preferably embodied is both self-opening and self-clamping. The port means is self-opening in that no separate tool such as a screwdriver or the like is required in order to break the frangible closure web 34. The tapered closure panels are also self-clamping since, upon inward movement of the cable into the box chamber, the angularly inwardly directed closure panels are slightly spread apart and their resiliency causes them to resistingly bear against the cable. Consequently, a reverse outward force thereafter applied to the cable causes the inner end portions of the closure panels to be urged by means of a camming action progressively more tightly against the cable, into increasing gripping engagement therewith, thereby effectively clamping the cable against reverse outward movement.

It will also be seen that the cable entry port means of the invention as preferably embodied is also both self-locating and self-adjusting for different sizes of electrical power cables passing into the box chamber. Thus, the provision of opposed inwardly angled closure panels serves to locate the electrical power cable within the box at a predetermined, consistent location, which is at the apex of the converging panels, irrespective of the cable size. Also, the preferred lengths and thicknesses of the closure panels, particularly when formed from a moldable plastic material, as is more fully described hereinafter, provide the panels with sufficient flexibility and resiliency so that they deflect laterally away from the point of convergence, thereby permitting the panels to adjust to the different cable sizes, and yet resistingly bear against the cable in their deflected condition. By recessing the base of the closure panels away from the aperture rim, as best seen in FIGS. 3 and 8, cables having thicknesses up to a thickness equal to the width of the entry aperture can be accommodated with satisfactory results.

Referring now more particularly to FIGS. 11–14 of the accompanying drawings, there is illustrated an alternative embodiment of the invention, wherein the cable entry port closure panels extend angularly inwardly from the rim of the port opening and are self-opening for quick entry of the cable therethrough, as well as self-locating and self-adjusting, but provide only slight clamping action against the installed electrical power cable. As alternatively embodied, the opposed closure panels 44 are of a uniform thickness throughout which is relatively thin, on the order of about 0.030" (approximately 1/32") thick, and the frangible connecting web 45 is on the order of about 0.010" thick, as indicated at t on FIG. 12, when injection molded from a thermoplastic resin material, more fully described hereinafter. In addition, the angle formed between each panel 44 and the end walls 3, 4 to which each is attached is preferably on the order of about 30°.

Figures 12, 13:
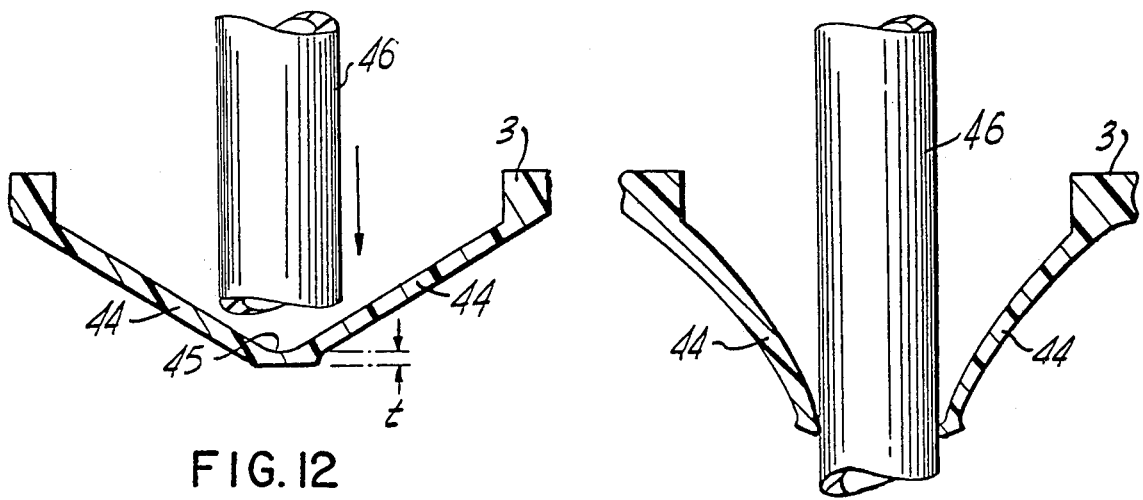
FIG. 12 is a view along section 12—12 of FIG. 11.
FIG. 13 is a section view similar to that shown in FIG. 12, showing the opposed panel members deflected from the aperture and resistingly bearing against the installed cable.

FIG. 13 illustrates panels 44 in their deflected condition and resistingly bearing against the installed cable, indicated by reference numeral 46.

Figure 14:
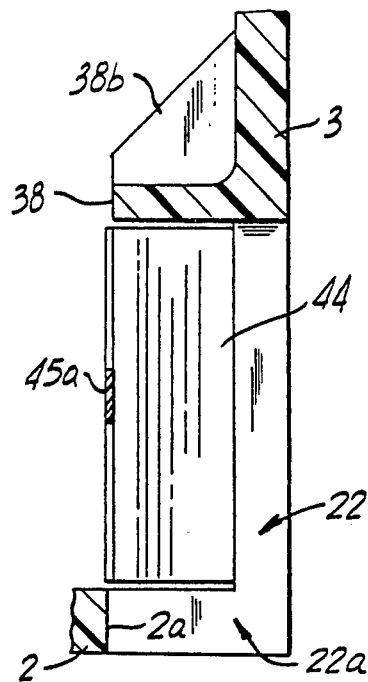
FIG. 14 is a view similar to FIG. 11, illustrating the opposed closure panel members joined by a frangible web at their approximate mid-sections only.

FIG. 14 illustrates at 45a a modification of the frangible web joining panels 44, wherein the web is attached to the closure panels along only a short section of their length, on the order of approximately ⅛–¼ inch.

In the embodiment shown in FIGS. 11–14, the inwardly converging closure panels 44 have been found to be advantageous in use since, in a manner similar to closure panels 14, they flex only a distance sufficient to permit the cable to pass through the port aperture, thereby maintaining a substantially closed opening even in use and hence minimizing debris collection and the hazard of fire spread.

Figure 15:
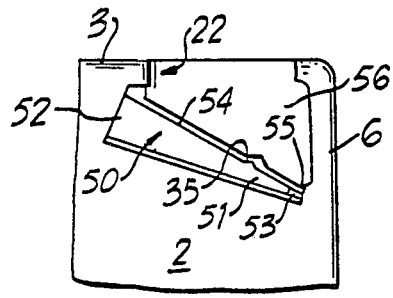
FIG. 15 is a fragmentary bottom plan view of an electrical outlet box constructed in accordance with another embodiment of the invention, wherein a single tapered closure panel extends angularly inwardly from one side of the cable entry port aperture and is frangibly interconnected with the side wall of the box adjacent the wall in which the aperture is formed.
Figure 16:
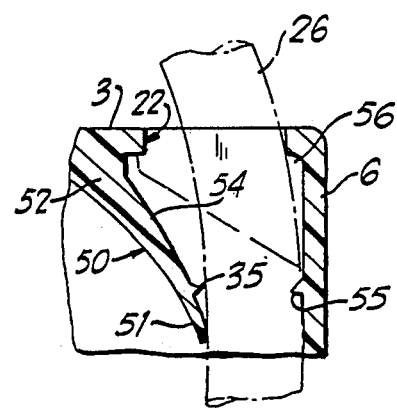
FIG. 16 is a fragmentary sectional view partly in plan, of the structure of FIG. 15, illustrating the closure panel in deflected position and resistingly bearing against the installed cable, the view also illustrating supplementary gripping projections on both the panel and the wall structure for grasping the installed cable.

Referring now more particularly to FIGS. 15–16 of the accompanying drawings, there is illustrated a further embodiment of the invention, wherein the cable entry port means includes only a single closure panel member, indicated by reference numeral 50.

As shown in FIGS. 15 and 16, panel 50 is formed integrally with end wall 3 at a point adjacent but recessed from one longitudinally extending side rim of aperture 22 and extends angularly inwardly therefrom terminating in a free end portion 51 adjacent the side wall 6 adjoining end wall 3. Advantageously, and as here embodied, panel 50 is tapered so as to have increased thickness at the base 52 thereof adjacent the rim of aperture 22, and is frangibly joined to side wall 6, by web 53 similar to any of the manners previously illustrated and described. Also advantageously, the outwardly facing surface 54 of panel 50 is provided with a supplemental gripping projection 35, as shown in panels 14 in FIG. 10, and a further gripping projection 55, similar in configuration to projection 35, is provided on the inside surface of side wall 6 at the point of the frangible attachment of panel 50 thereto. A rigid closure panel 56, similar to panel 38 but formed in the general shape of a right triangle, the hypotenuse of which extends generally parallel to panel 50, substantially closes the right triangularly-shaped opening formed in the bottom wall 2 and facing the front opening 8 of the outlet box.

It will thus be seen that, in a similar manner to that previously described and illustrated in connection with the inwardly converging pair of tapered closure panels 14 joined by frangible web 34, and as illustrated in FIG. 16, web 53 may be broken by manually pushing the end of an electrical power cable against panel 50, whereupon panel 50 will deflect laterally away from aperture 22 and thereafter resistingly bear against the installed cable. Exertion of a reverse outward force on cable 26 thereafter causes panel end 51 and/or projections 35 and 55 to be cammed into progressively tighter gripping engagement with the cable, thereby clamping the cable against reverse outward movement.

Although the embodiment of the invention in FIGS. 15–16 is thus also self-opening and self-clamping, as well as self-locating and self-adjusting to different cable sizes, it will be understood that panel 50 need not be tapered and may be of substantially uniform thickness, similar to panels 44, if clamping action is not required.

It will also be understood that closure panel 50 may be spaced inwardly of its adjacent end wall 3, 4 by a base projection similar to 14a, as best shown in FIG. 3, to permit use of a conventional entry port "knockout" closure panel. Other modifications of panel 50 based on the description and illustrations herein will likewise be apparent.

Figure 17:
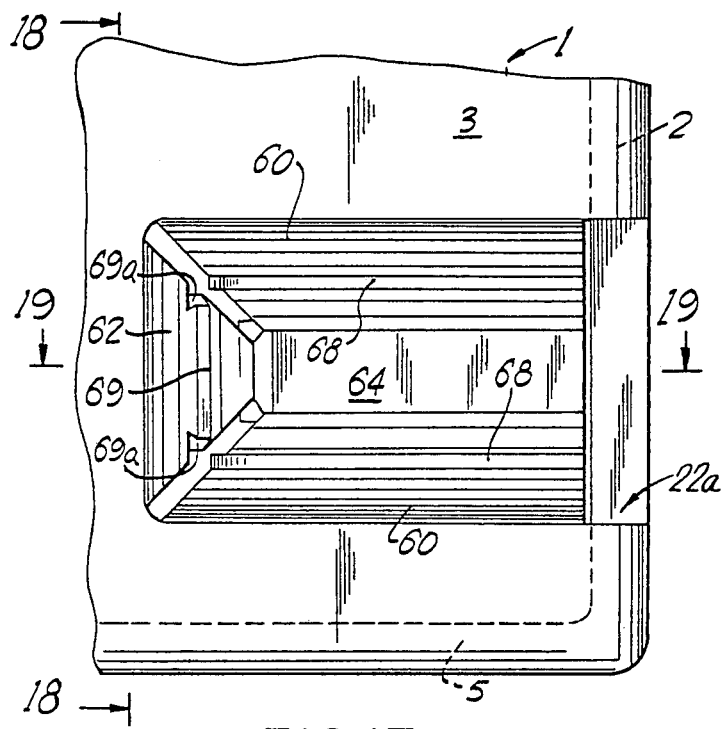
FIG. 17 is a fragmentary elevational view of an electrical outlet box constructed similar to that shown in FIGS. 7-10, wherein a pair of opposed tapered and angled closure panels converge toward one another from the longitudinal side rims of the cable entry aperture and a third tapered closure panel converges angularly downwardly from the box wall structure toward the convergent inner ends of the pair of opposed closure panels.
Figure 18:
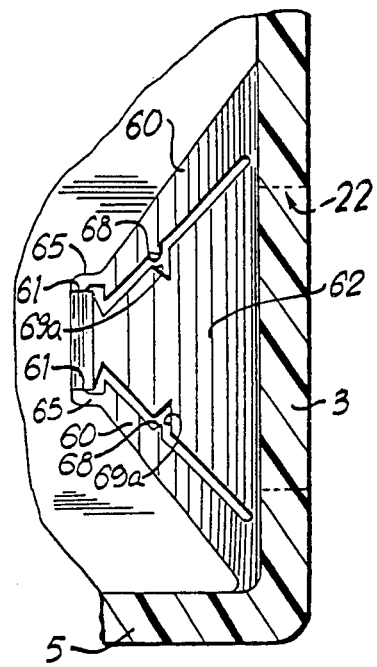
FIG. 18 is a view taken along lines 18—18 of FIG. 17.
Figure 19:
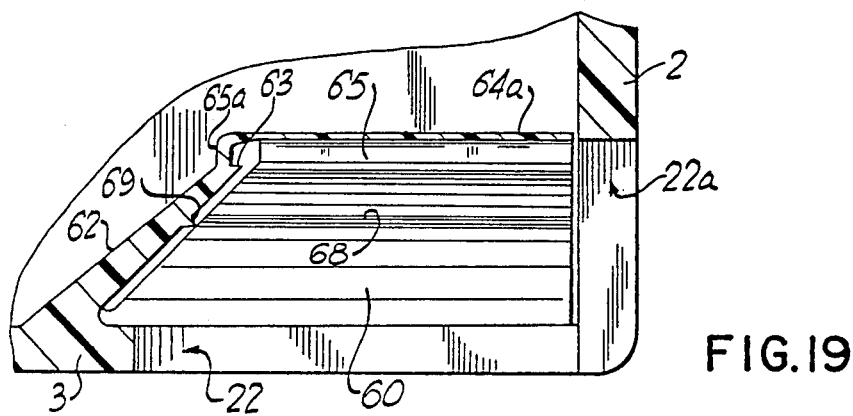
FIG. 19 is a view taken along lines 19—19 of FIG. 17.

Referring now more particularly to FIGS. 17–19 of the accompanying drawings, there is illustrated another embodiment of the cable entry port means of the invention similar to FIGS. 7–10. As here embodied, a pair of opposed converging tapered panel members, each designated 60, depend from the inside surface of end wall 3, substantially as described with reference to FIGS. 7–10. A third closure panel 62 is attached to the inside of end wall 3 adjacent the front rim portion of aperture 22, and projects towards bottom wall 2 at an acute angle relative to end wall 3. To accommodate the angular configuration of third panel 62, the front facing edges of both panels 60 are inclined toward bottom wall 2 at essentially the same angle as panel 62.

The inward edges 61 of each panel member 60 are coupled by a frangible web 64 in any of the ways previously described. Here, web 64 is attached along each of the edges 61 by a recessed web 65. The web also includes a central portion of reduced thickness, indicated at 64a in FIG. 19, as previously discussed.

The innermost edge 63 of third panel 62 is also coupled to web 64 by another frangible web portion 65a, which is recessed like web portions 65 to provide a sharp grasping edge. It will be understood that third panel edge 63 could be formed without attachment to web 64.

As in the various embodiments previously described, the outwardly facing surfaces of panels 60, 62 may be formed with suitable secondary, or supplementary, grasping means. Thus, panels 60, 62 are shown with rib-like projections 68, 69, respectively, similar to projections 35, and third panel 62 is further formed with notches 69a for accommodating the mold parts needed to form projections 68.

Figure 20:
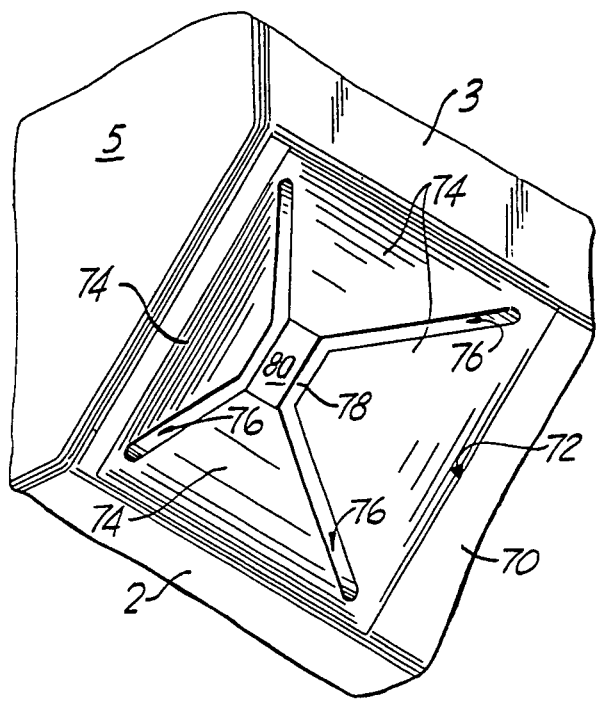
FIG. 20 is a fragmentary perspective view of an electrical outlet box constructed in accordance with a further embodiment of the invention, wherein a group of four tapered closure panel members each converge angularly toward one another and a center frangible web joins one opposed pair of converging panel members, the cable entry port aperture and closure structure being located in an angled corner of the outlet box joining the bottom wall and the adjacent front-to-rear wall.
Figure 21:
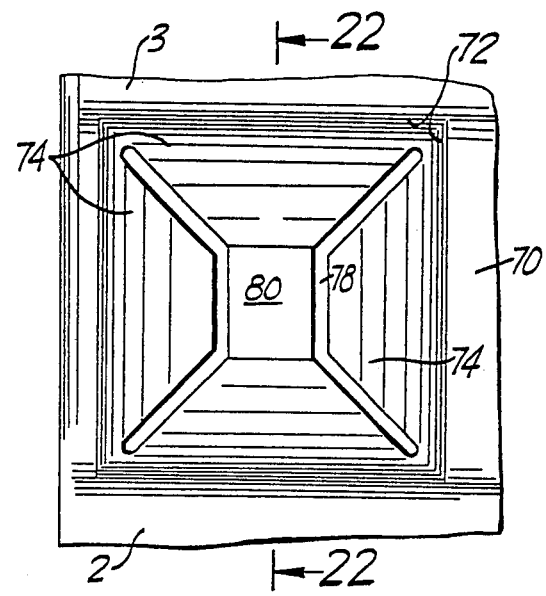
FIG. 21 is a bottom plan view of the diagonal wall portion of FIG. 20 joining the bottom wall and the adjacent front-to-rear wall.
Figure 22:
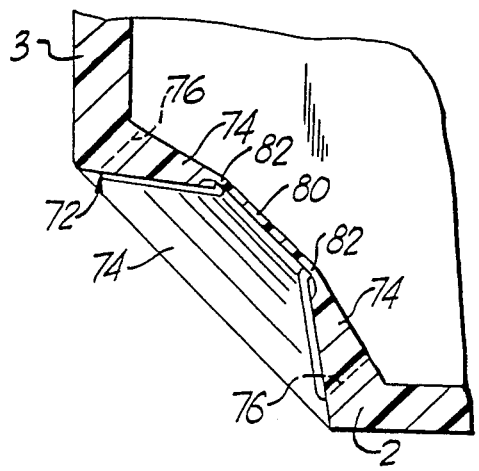
FIG. 22 is a sectional view, partly in elevation, taken along line 22—22 of FIG. 21.

Referring now more particularly to FIGS. 20–22 of the accompanying drawings, there is illustrated a further embodiment of the invention, wherein the cable entry port means includes a group of four closure panel members, each adapted to deflect laterally away from the aperture upon passage of a cable therethrough and to thereafter resistingly bear against the installed cable. As here embodied, electrical outlet box 1 is advantageously formed with diagonal wall portions 70 joining bottom wall 2 with each of end walls 3 and 4 and the cable entry apertures 72, substantially square in shape, are formed in diagonal sections 70. Four closure panel members 74, separated by narrow openings 76, each converge angularly inwardly from a side rim of aperture 72 toward a common central opening 78 which is smaller than the cross-sectional dimensions of the electrical power cable. Advantageously, opening 78 is substantially closed by a frangible web 80 joining an opposed pair of panel members 74. Also advantageously, frangible webs 82 connect web 80 to panel members 74 in any of the various manners previously discussed.

Figure 23:
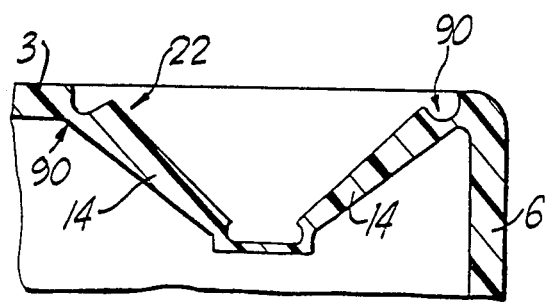
FIG. 23 is a fragmentary cross-section view, similar to FIG. 8, of a further embodiment of a cable entry port structure for an electrical outlet box constructed in accordance with the invention, illustrating the pair of opposed tapered and converging closure panel members each mounted at one end adjacent the rim of the cable entry aperture by a live, integrally molded-in hinge.

Referring now more particularly to FIG. 23, there is illustrated a further embodiment of the invention, wherein the pair of opposed tapered inwardly converging closure panel members illustrated in FIGS. 7–9 are joined to end wall 3 of outlet box 1 by means of a live, integrally molded-in hinge, indicated generally by reference numeral 90. As is well known by persons of ordinary skill in the molding art, plastic materials may be molded with a constricted area, such as shown at 90, in such a manner that the molecular structure becomes oriented so as to be flexible, while the surrounding material remains relatively rigid. The term "live hinge" is commonly used in the art to refer to such an integral flexible constriction in a molded article.

Figure 24:
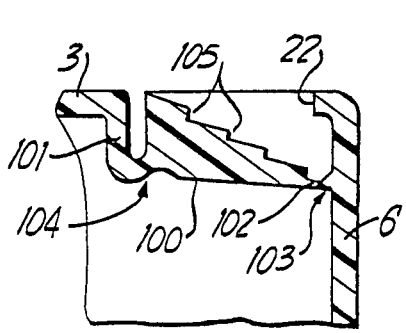
FIG. 24 is a fragmentary cross-section view similar to FIGS. 15-16 of another embodiment of a cable entry port structure for an electrical outlet box constructed in accordance with the invention, wherein the closure panel is mounted at the base thereof by means of a live, integrally molded-in hinge located relatively inwardly of the wall structure of the box containing the cable entry port aperture, the view also illustrating a plurality of rib-like gripping projections forming a serrated outwardly facing surface on the closure panel.
Figure 25:
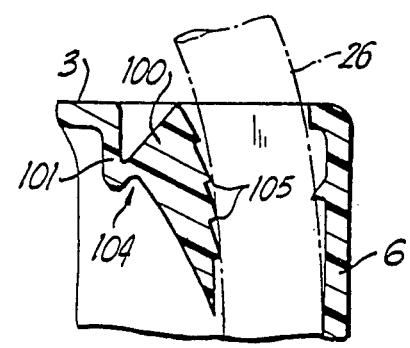
FIG. 25 is a similar fragmentary cross-sectional view of the embodiment shown in FIG. 24 illustrating the closure panel member in a deflected condition and in cammed, clamping engagement with an installed electrical power cable.

FIGS. 24–25 illustrate a further embodiment of the invention including modified forms of the live hinge construction shown in FIG. 23 and the rib-like supplementary cable gripping projections shown in FIGS. 10 and 15. Thus, as here embodied, a single inwardly angled closure panel member 100 is formed integrally with a projection or lug 101 extending relatively inwardly of end wall 3 a distance approximately equal to the point of attachment 103 of the free end portion 102 of panel 100 with the adjoining side wall 6 of outlet box 1. End 102 of panel 100 is advantageously frangibly attached to side wall 6 in the manner previously described in connection with FIGS. 15–16. As here embodied, panel 100 is also mounted to lug 101 on end wall 3 by means of a live hinge construction, indicated generally at 104.

Also, as here embodied, the outwardly facing surface of panel 100 is provided with a plurality of rib-like projections 105 extending over the length thereof, each being similar to projections 35, so as to provide a serrated surface for resistingly bearing against installed cable 26 and for gripping the cable upon reverse outward movement thereof.

It will be seen from the foregoing that hingedly mounting closure panel 100 relatively inwardly of the cable entry aperture 22 locates the rotation point about which panel 100 develops its camming action closer to the point of gripping engagement with cable 26 to thereby provide maximum gripping force of panel 100 against cable 26. Also, the provision of a serrated surface on panel 100 serves to ensure gripping engagement of panel 100 with all sizes of electrical cable installed in the cable entry aperture 22.

While it will be understood from the foregoing description that the outlet box of the present invention is not limited to the use of particular materials, the outlet box and the cable entry port structure are preferably formed integrally from a molded thermoplastic resin material. In this regard, a certain injection moldable thermoplastic resin material has been found to produce highly satisfactory results and is given as an example of the preferred mode of carrying out the invention, together with other examples of suitable materials, from which still further equivalent materials will be apparent to those of ordinary skill in the art. Thus, it has been found that a thermoplastic resin blend of ABS (i.e., acrylonitrile-butadiene-styrene) and PPO (i.e., polyphenylene oxide) sold by the General Electric Company under the trade name "NORYL", Grades SE-100 or SE-1, is a particularly preferred material from the standpoint of ease of moldability, strength and high temperature resistance. Moreover, the "NORYL" material is sufficiently strong to meet the current standards of Underwriters' Laboratories, Inc. for electrical outlet box cable clamping devices. It has also been found that a vinyl resin material such as PVC (i.e., polyvinyl chloride) sold by the Ethyl Corporation under the trade designation "Ethyl 7042" operates satisfactorily where only slight clamping action against the cable is desired or necessary, as in the embodiment of the invention shown in FIGS. 11-14. However, this material does not meet the aforementioned current Underwriters' Laboratories' standards for cable clamps in electrical outlet boxes. In addition to the foregoing, the outlet box and cable entry port structure of the present invention may be formed integrally from a metallic material, for example, by cast molding from aluminum or an aluminum alloy, or by die stamping the closure panel members from a metal having suitable flexibility and resiliency, such as, e.g., spring steel the latter being thereafter bent inwardly to provide the cable entry port structure.

To the extent not already indicated, it also will be understood by those of ordinary skill in the art that any one of the various specific embodiments herein described and illustrated may be further modified to incorporate features shown in other of the specific embodiments, as desired. Thus, for example, the provision of a serrated gripping surface on panel 100 as shown in FIGS. 24-25 may be utilized on each of the opposed pair of closure panels 14 shown in FIGS. 1-10. Similarly, the hinged mounting shown in FIGS. 23-25 may be utilized with the closure panels 44 shown in FIGS. 11-14.

The invention in its broader aspects therefore is not limited to the specific embodiments herein shown and described but departures may be made therefrom within the scope of the accompanying claims, without departing from the principles of the invention and without sacrificing its chief advantages.

What is claimed is:

1. In an electrical outlet box having a wall structure providing front to rear wall means and a bottom wall interconnected therebetween, the front to rear wall means and bottom wall defining a chamber within the wall structure which opens through the front of the box, and wherein said wall structure houses cable entry port means for the passage of electrical power cable into said box chamber, the improvement therein which comprises, said cable entry port means including:

said front-to-rear wall means and said bottom wall being interconnected by an intermediate wall portion extending generally diagonally therebetween, at least one aperture located in said diagonally extending intermediate wall portion having a plural-sided configuration;

closure panel means depending from the rim of said aperture and extending angularly inwardly from the plane of said aperture, said closure panel means comprises a plurality of closure panels converging angularly inwardly toward each other from each side rim of said plural-sided aperture, the convergent inner free ends of said plurality of converging closure panels separated by a distance less than the narrowest dimension of said electrical power cable; and said free end portions of said closure panels adapted to deflect away from each other upon passage of said cable into said aperture and to thereafter resistingly bear against the installed cable.

2. An electrical outlet box as claimed in claim 1, wherein said plurality of closure panels are each tapered so as to have increased thickness at the base thereof adjacent each of said side rims of said plural-sided aperture, the free end portions of each of the tapered and angled closure panels having sufficient flexibility and resiliency so as to be deflected away from one another upon passage of said cable into said aperture and to thereafter resistingly bear against the installed cable, whereby a reverse outward force applied to said cable causes said free end portions of each of said tapered and angled closure panels to be urged by a camming action progressively more tightly against said cable to thereby clamp said cable against removal from said aperture.

3. An electrical outlet box as claimed in claim 2, wherein each of said plurality of closure panels have a generally trapezoidal shape.

4. An electrical outlet box as claimed in claim 3, including a frangible web joining at least two of said convergent inner free ends of said plurality of closure panels, said frangible web being readily pierceable upon manually forcing the end of said electrical power cable thereagainst, whereby said frangible web is self-opening.

5. An electrical outlet box as claimed in claim 2, wherein said closure panel means and said wall structure are formed integrally from a blend of acrylonitrile-butadiene-styrene and polyphenylene oxide thermoplastic resins and the thickness of said base of each of said tapered and angled closure panels is approximately double the thickness of said free end portions thereof.

6. An electrical outlet box as claimed in claim 1, wherein said plurality of closure panels substantially closes said aperture.

* * * * *